(12) United States Patent
Jol

(10) Patent No.: US 8,506,327 B2
(45) Date of Patent: Aug. 13, 2013

(54) PORTABLE ELECTRONIC DEVICES WITH SEALED CONNECTORS

(76) Inventor: Eric Jol, San Jose, CA (US)

( * ) Notice: Subject to any disclaimer, the term of this patent is extended or adjusted under 35 U.S.C. 154(b) by 773 days.

(21) Appl. No.: 12/571,255

(22) Filed: Sep. 30, 2009

(65) Prior Publication Data

US 2011/0076883 A1 Mar. 31, 2011

(51) Int. Cl.
*H01R 13/40* (2006.01)

(52) U.S. Cl.
USPC ....... 439/587; 439/521; 264/272.11; 361/737

(58) Field of Classification Search
None
See application file for complete search history.

(56) References Cited

U.S. PATENT DOCUMENTS

| | | | |
|---|---|---|---|
| 2,761,111 A | 8/1956 | Klostermann | |
| 3,221,292 A | 11/1965 | Swanson et al. | |
| 3,643,208 A * | 2/1972 | Massa, Jr. | 439/606 |
| 3,816,641 A | 6/1974 | Iversen | |
| 3,850,495 A | 11/1974 | Glover | |
| 4,082,398 A | 4/1978 | Bourdon et al. | |
| 4,274,700 A | 6/1981 | Keglewitsch | |
| 4,387,945 A | 6/1983 | MacAvoy | |
| 4,480,151 A | 10/1984 | Dozier | |
| 4,619,496 A * | 10/1986 | Forney et al. | 439/434 |
| 4,634,208 A * | 1/1987 | Hall et al. | 439/607.51 |
| 4,657,323 A | 4/1987 | Erbe | |
| 4,808,115 A * | 2/1989 | Norton et al. | 439/79 |
| 5,108,294 A * | 4/1992 | Marsh et al. | 439/76.1 |
| 5,108,317 A | 4/1992 | Beinhaur et al. | |
| 5,236,375 A | 8/1993 | Kachlic | |
| 5,319,522 A | 6/1994 | Mehta | |
| 5,356,304 A | 10/1994 | Colleran | |
| 5,485,673 A * | 1/1996 | Lau | 29/883 |
| 5,535,512 A * | 7/1996 | Armogan | 29/877 |
| 5,562,497 A * | 10/1996 | Yagi et al. | 439/607.47 |
| 5,595,504 A | 1/1997 | Muller | |
| 5,708,297 A * | 1/1998 | Clayton | 257/723 |
| 5,730,621 A * | 3/1998 | Wang | 439/541.5 |
| 5,823,824 A | 10/1998 | Mitamura et al. | |
| 6,183,307 B1 * | 2/2001 | Laity et al. | 439/676 |
| 6,368,130 B1 | 4/2002 | Fukuda | |

(Continued)

FOREIGN PATENT DOCUMENTS

| | | |
|---|---|---|
| JP | 7142116 | 6/1995 |
| WO | 2009053778 | 4/2009 |

OTHER PUBLICATIONS

Wang, Erik L et al. U.S. Appl. No. 12/119,986, filed May 13, 2008.

(Continued)

*Primary Examiner* — Michael Zarroli

(57) ABSTRACT

Portable electronic devices may have sealed connectors. A sealed connector may be formed using a multi-shot insert molding process. The sealed connector may include contacts. A first shot of thermoplastic may be injected to form a contact housing that is molded around the contacts. The contact housing may be encased in a metal shell. A second shot of thermoplastic material may be inserted to form a connector housing that is molded around the contact housing. An elastomeric sealing member may be integrated into the connector housing. A sealed connector formed in this way may be fitted into a device housing of an electronic device. The sealed connector may prevent ingress of liquid, dirt, or other undesirable debris that may enter into the device through the connector port. A flex circuit within the device may have solder pads that may be soldered to corresponding contacts in the connector.

21 Claims, 12 Drawing Sheets

(56) References Cited

U.S. PATENT DOCUMENTS

| | | |
|---|---|---|
| 6,572,416 B2 | 6/2003 | Patwardhan et al. |
| 6,601,296 B1 | 8/2003 | Dailey et al. |
| 6,616,480 B2 | 9/2003 | Kameyama |
| 6,638,090 B2 | 10/2003 | Wakata |
| 6,776,660 B1 | 8/2004 | Kubota et al. |
| 6,913,493 B2 | 7/2005 | Berg et al. |
| 6,953,357 B2 | 10/2005 | Fukushima et al. |
| 7,163,421 B1* | 1/2007 | Cohen et al. ............. 439/607.02 |
| 7,195,496 B2* | 3/2007 | Biermann et al. ............. 439/79 |
| 7,282,657 B2 | 10/2007 | Wimmer |
| 7,341,487 B2* | 3/2008 | Wu ............. 439/607.51 |
| 7,798,853 B2* | 9/2010 | Shi et al. ............. 439/607.58 |
| 7,819,702 B2* | 10/2010 | Murakami ............. 439/660 |
| 8,102,657 B2* | 1/2012 | Hiew et al. ............. 361/737 |
| 2008/0032540 A1 | 2/2008 | Fukushima |
| 2008/0166905 A1 | 7/2008 | Murphy et al. |
| 2008/0299837 A1 | 12/2008 | Long et al. |
| 2009/0088031 A1* | 4/2009 | Rahman et al. ............. 439/736 |
| 2010/0330935 A1* | 12/2010 | Maggert et al. ............. 455/90.3 |

OTHER PUBLICATIONS

Ayala, Enrique, et al. U.S. Appl. No. 12/142,744, filed Jun. 19, 2008.

Mittleman, Adam D., et al. U.S. Appl. No. 12/113,910, filed May 1, 2009.

* cited by examiner

PORTABLE ELECTRONIC DEVICES WITH SEALED CONNECTORS

BACKGROUND

This invention relates generally to sealed connectors, and more particularly, to moisture-sealed connectors for portable electronic devices such as handheld electronic devices.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Portable electronic devices such as handheld electronic devices may contain complex electronic circuitry in a compact area. Electronic components such as memory, processors, and other circuits are highly sensitive to moisture. Too much moisture can create unintended low resistance connections between nodes that are meant to be at different voltages making the circuits perform unpredictably or malfunction. Circuits may also be adversely affected by exposure to dust or other contaminants. Because portable electronic devices may not always be operated in a controlled environment, they may be more prone to be exposed to moisture, dust, or other contaminants than stationary electronic devices.

A portable electronic device typically has a connector that can mate with an external mating connector. A connector in a conventional portable electronic device may be constructed by pressing pins into holes in a plastic connector housing. The plastic connector housing is then surrounded by a stainless steel shell. The plastic housing with the stainless steel shell can be mounted within a port opening in the housing of the portable electronic device. A conventional connector formed in this way has multiple junctions that are not fully sealed. This is because the interfaces in these junctions are only held in contact with each other by a friction fit. Friction-fit junctions allow liquids and other contaminants to intrude into the interior of the housing.

Conventional connectors may have multiple friction-fit junctions. A first friction-fit junction that may be present is the interface between the connector pins and the plastic connector housing. A second friction-fit junction that may be present is the interface between the plastic connector housing and the stainless steel shell. A third friction-fit junction that may be present is the interface between the stainless steel shell and the housing of the portable electronic device. The stainless steel shell may have two latch holes with which an external mating connector can be secured to the electronic device. The friction-fit interfaces and the latch holes are not therefore sealed and represent possible conduits through which undesirable moisture and debris can infiltrate the portable electronic device.

It would therefore be desirable to be able to provide electronic devices with connectors that can effectively prevent moisture infiltration.

SUMMARY

Electronic devices may be provided with sealed connectors. A moisture-sealed connector can help prevent moisture infiltration into a device interior.

A portable electronic device may have a sealed connector that is used as a data port. The sealed connector may be adapted to connect to a mating connector such as a plug on a cable or accessory. The connector may be formed using a multi-shot insert molding process. The connector may have contact leads ("contacts"). A first shot of thermoplastic material may be injected to form a contact housing that is molded around the contact leads (e.g., the contacts serve as the insert pieces for the insert molding process). There may be 30 laterally spaced contacts in a connector. The contacts may be inserted into the contact housing the insert molding technique (e.g., for a 30-pin connector). The interface between the contacts and the thermoplastic housing is sealed, because the housing forms a tight bond or seal around each contact (e.g., by mechanical bonding).

The contact housing may be encased within a metal shell. The metal shell may provide physical guidance for a mating connector (e.g., a plug). The contact housing may initially be friction fit into the metal shell.

After this friction this has been formed, a second shot of thermoplastic material may be injected over the contact housing. The second shot of plastic may form additional connector housing structures that are molded around the metal shell. The second shot may be based on the same materials as the first shot or may be based on a different blend of polymer than the first shot. An elastomeric sealing member (e.g., a gasket) may be formed as an integral part of the plastic connector housing.

The connector housing, the metal shell, the contact housing, and the contact leads form a connector. The connector may be mounted within a device housing. When assembled, the sealing member in the connector may press against the walls of the device housing to seal the interface between the connector and the device housing.

A flex circuit or rigid-flex circuit assembled within the device may have solder pads that are soldered to corresponding contacts in the connector. The connector may have 30 contacts (e.g., the connection may be a 30-pin connector). If desired, the connector may be formed as an integral portion of the device housing.

Further features of the connector, its nature and various advantages will be more apparent from the accompanying drawings and the following detailed description.

DETAILED DESCRIPTION

The present invention relates to sealed connectors for electronic devices.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), remote controllers, global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
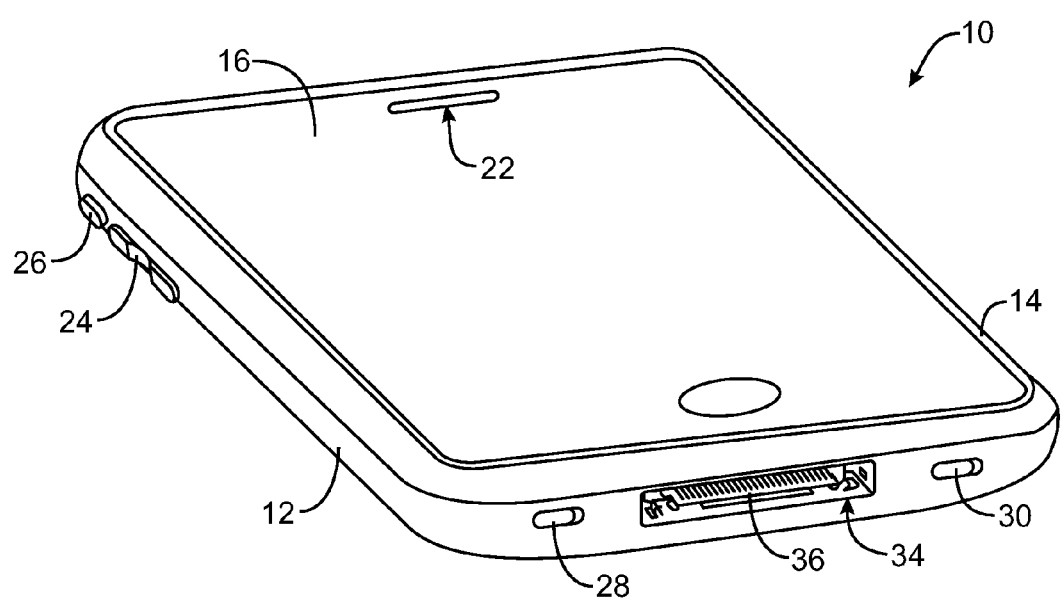
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a handheld electronic device that supports 2G and/or 3G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc.

Device 10 may have device housing 12. Antennas for handling wireless communications may be housed within device housing 12 (as an example).

Device housing 12, which is sometimes referred to as a case, may be formed from any suitable materials including, plastic, glass, ceramics, metal, or other suitable materials, or a combination of these materials. A two-piece arrangement may be used in which an upper housing assembly mates with a lower housing assembly. The upper assembly may include a touch screen. The lower assembly may include control circuits, connectors, and other components. In some situations, device housing 12 or portions of device housing 12 may be formed from a dielectric or other low-conductivity material, so that the operation of conductive antenna elements that are located in proximity to housing 12 is not disrupted. Device housing 12 or portions of device housing 12 may also be formed from conductive materials such as metal. An advantage of forming device housing 12 from a dielectric material such as plastic is that this may help to reduce the overall weight of device 10 and may avoid potential interference with wireless operations.

Device housing 12 may have a bezel, such as bezel 14. Bezel 14 may be formed from a conductive material and may serve to hold a display such as display 16 or other device with a planar surface in place on device 10 and/or to form an aesthetically pleasing trim around the edge of device 10.

Display 16 may be a liquid crystal diode (LCD) display, an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 20. Button 20 may be, for example, a menu button.

A user of electronic device 10 may supply input commands using user input interface devices such as button 20 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown as being formed on the top face of electronic device 10 in the example of FIG. 1, buttons such as button 20 and other user input interface devices may generally be formed on any suitable portion of electronic device 10. For example, a button such as button 20 or other user interface control may be formed on the side of electronic device 10. Buttons and other user interface controls can also be located on the top face, rear face, or other portion of device 10.

Device 10 may also have controller buttons such as volume up and down buttons 24 and a ringer A/B switch 26 (to switch device 10 between ring and vibrate modes). Openings 28 and 30 may, if desired, form speaker and microphone ports. Speaker port 28 may be used when operating device 10 in speakerphone mode. Opening 22 may also form a speaker port. For example, speaker port 22 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

Device 10 may also have audio and video jacks that allow device 10 to interface with external components. Data ports in device 10 may include power pins to recharge a battery within device 10 or to operate device 10 from a direct current (DC) power supply, data pins to exchange data with external components such as a personal computer or peripheral, audio-visual jacks to drive headphones, a monitor, or other external audio-video equipment. Device 10 may also have a subscriber identity module (SIM) card port to authorize cellular telephone service, a memory card slot, etc. The functions of some or all of these components and the internal circuitry of electronic device 10 can be controlled using input interface devices such as touch screen display 16.

Electronic device 10 may have ports such as port 34. Port 34, which may sometimes be referred to as a data port may be used as an input-output port (e.g., when connecting device 10 to a mating dock connected to a computer or other electronic device). Port 34 may have a sealed connector such as moisture-sealed data port connector 36. Connector 36 may be a 30-pin data port connector that receives a mating connector (e.g., a 30-pin data port connector plug). Port 34 and sealed connector 36 may sometimes be referred to as a dock connector. Connector 36 may be sealed (e.g., moisture-sealed) sufficiently with respect to the walls of housing 12 to prevent-ingress of moisture, dust, dirt, or other debris that could cause electronic device 10 to malfunction.

Sealed connector 36 may be formed using an injection molding process such as an insert molding process.

Injection molding is a manufacturing process for producing parts from thermoplastic materials. Suitable thermoplastics for injection molding can be formed from polymers that assume a liquid (moldable) state when heated and that solidify to a solid plastic state when sufficiently cooled.

Thermoplastic materials that may be used for forming connection 36 may include polyethylene, polypropylene, or other polymers suitable for use in injection molding techniques.

Figure 2:
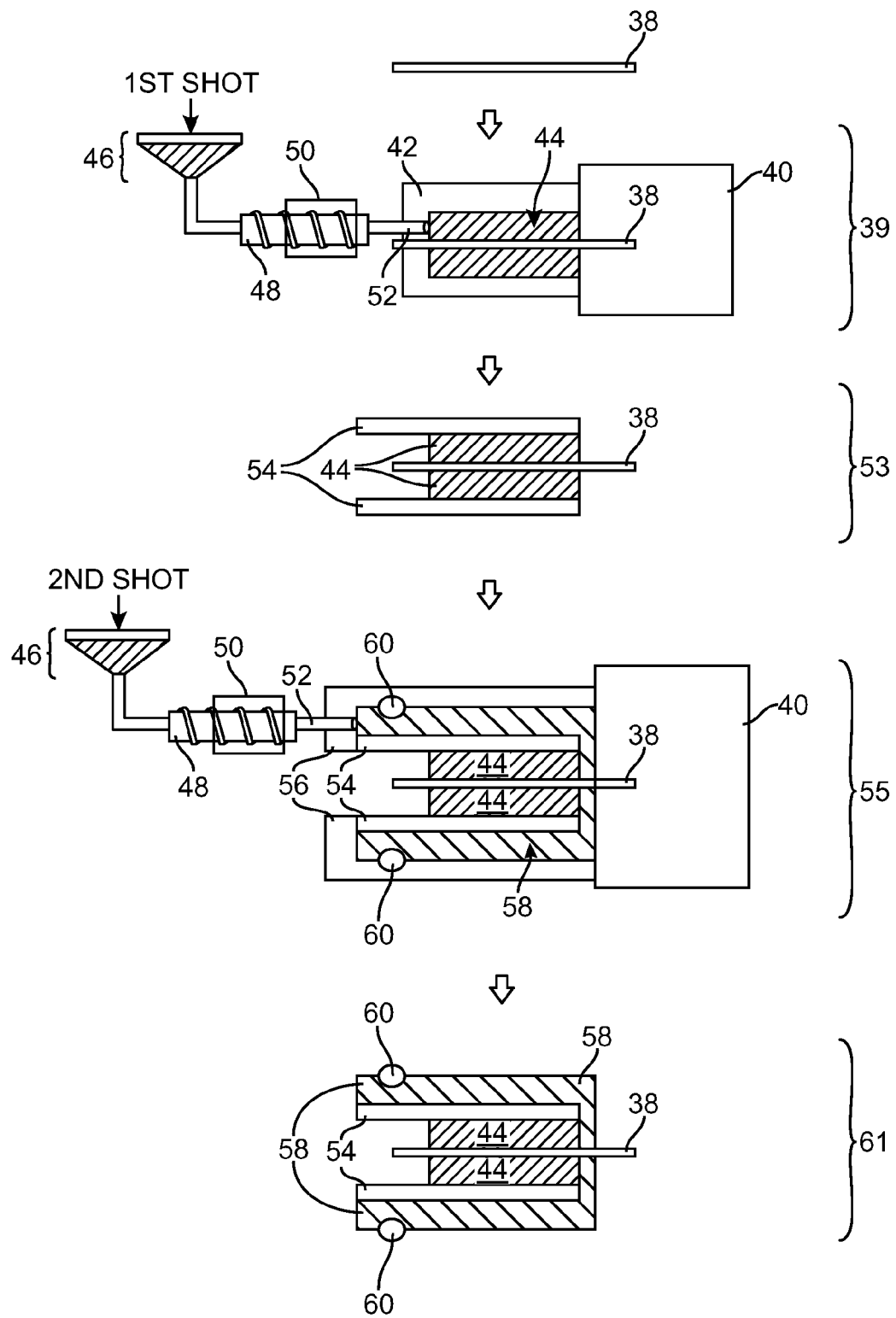
FIG. 2 is a diagram showing how an illustrative sealed connector may be formed using an insert molding tool in accordance with an embodiment of the present invention.

FIG. 2 shows cross-sectional side views of an injection molding system during steps involved in forming an illustrative connector using a multi-shot insert molding process. The connector that is formed in this way may have pins such as pin 38. Pin 38, which is also sometimes referred to as a contact lead or contact, may be formed from a thin piece of conductor (e.g., copper, plated copper, brass, or any suitable metal).

At step 39, pin 38 may be held in place by holding structure 40. Mold 42 may be placed around pin 38, so that mold 42 encloses pin 38 within a mold cavity. A first shot of pelletized thermoplastic material (e.g., thermoplastic granules or "resin") may be added to hopper 46. The material may be gravity fed into a screw-type plunger 48 (or an injection ram) that is heated by heating unit 50. The heat generated by unit 50 and the rotation of the screw in plunger 48 may result in elevated temperatures and a shearing action on the thermoplastic pellets that causes the pellets to melt into molten plastic. Screw rotation in plunger 48 may push the molten plastic towards the mold cavity. Mold 42 may have an opening through which nozzle 52 may be inserted to connect with the mold cavity. Plunger 48 may inject the molten plastic into the mold cavity through nozzle 52. The molten plastic may be injected with a high enough pressure to completely fill the mold cavity.

When the mold cavity has been completely filled, the molten plastic may be cooled by running water through channels in mold 42. The plastic that solidifies within the mold cavity forms a first housing 44 that molds around pin 38. This process is referred to as insert molding, because thermoplastic is injected into a mold cavity around an insert piece (i.e., pin 38). At the completion of the cooling cycle, mold 42 may be released. First housing 44 may be ejected.

A tightly sealed mechanical bond may be formed when the insert consists of a different material than the resin. A mechanical bond may thus be formed between pin 38 (e.g., a metal insert) and first housing 44 (e.g., a plastic connector housing). To achieve a well-formed mechanical bond, pin 38 provides a surface capable of retaining the surrounding plastic under normal conditions (e.g., normal operating temperatures and stresses). The bond between pin 38 and contact first housing 44 may form an interface that is sealed sufficient to make the interface between pin 38 and first housing 44 impervious to moisture.

At step 53, pin (contact) housing 44 may be encased within optional metal cover 54. Metal cover 54 may be formed from a thin sheet of stainless steel or any suitable metal or material that can help provide mechanical support for pin housing 44.

At step 55, a second shot of pelletized thermoplastic material may be injected to form a second housing (housing 58). Housing 58 is molded around metal cover 54 (e.g., by using the insert molding process discussed in connection with step 39). The second shot may use a different type of thermoplastic material than the first shot, if desired. A different mold (e.g., mold 56) may be used to form second housing 58. An elastomeric sealing structure 60 (e.g., a rubber gasket) may be formed as an integral part of second housing 58 during step 55 or may be added later. Sealing structure 60 may be formed in a separate injection molding process prior to step 55. At step 61, mold 56 may be released. This allows second housing 58 to be ejected.

In some situations, the sealed interfaces in an insert molded connector may form chemical bonds. For example, a chemical bond may be formed between second housing 58 and sealing structure 60 if the two parts are made from similar materials. Chemical bonds tend to be stronger and even less likely to leak than mechanical bonds. When constructed using insert molding techniques of the type shown in FIG. 2, every junction or interface formed within the connector is sealed off by at least a mechanical bond or a chemical bond.

If desired, sealing structure 60 may be formed as an integral part of second housing 58. Sealing structure 60 need not be attached to housing structure 58 during step 55. For example, mold 56 may include a groove shape that forms a corresponding groove in second housing 58. The groove may be configured so that sealing structure 60 may be placed into the groove during subsequent assembly operations. Because sealing structure 60 is elastomeric, structure 60 may form a seal when compressed (e.g., the groove may exert a compressive force against the elastomeric gasket that compresses the gasket between the walls of the groove and corresponding housing walls in device housing 12).

The insert molding process shown in FIG. 2 is merely illustrative. More than two shots of insert molding may be used to seal of any number of junctions or interfaces in a connector, if desired.

Figure 3:
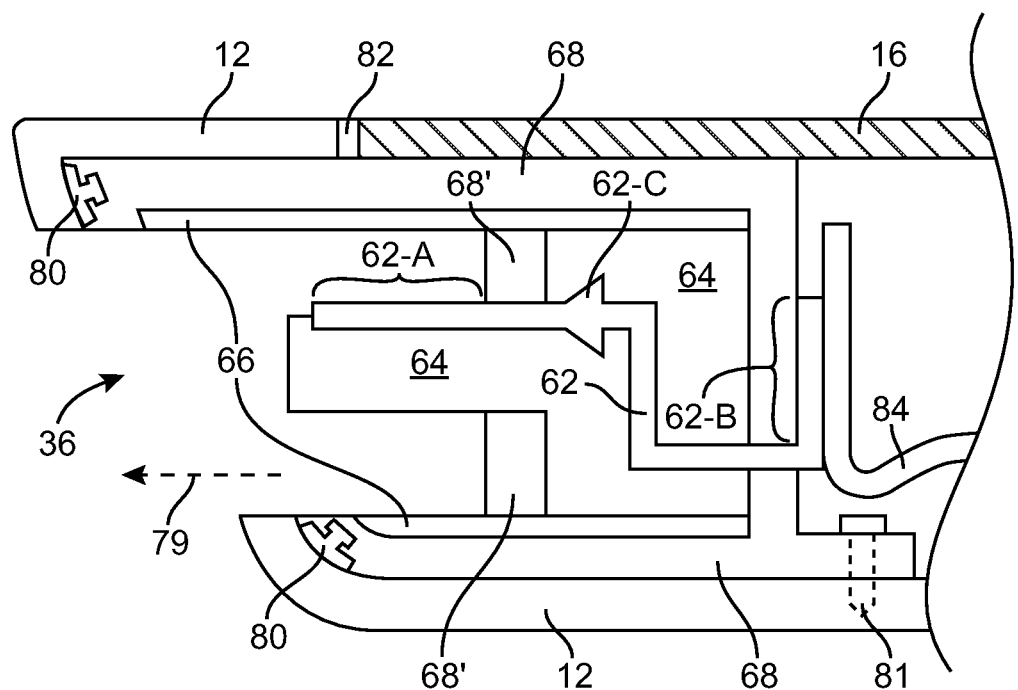
FIG. 3 is a cross-sectional side view of an illustrative sealed connector that includes a metal shell in accordance with an embodiment of the present invention.

Sealed connector 36 of FIG. 1 may be formed using a multi-shot insert molding technique of the type described in connection with FIG. 2. FIG. 3 shows a cross-sectional side view of connector 36 mounted within device housing 12. Conductive signal contacts 62 (referred to as pins 38 in the generalized discussion of FIG. 2) are located at the core of connector 36. Contacts 62 may be formed from narrow (wire-shaped) sheets of platinum, silver, iron, copper, aluminum, gold, plated metals, or any suitable conductor. Contacts 62 may each have multiple bends (see, e.g., the three right-angled bends in FIG. 3). Contacts 62 may serve as electrical leads or pins and are therefore sometimes referred to as contact pins or contact leads.

Contact housing 64 may be molded around contacts 62 using an insert molding technique of the type described in connection with FIG. 2. A first shot of thermoplastic such as polyamide (e.g., PA 46), fluoroplastic (e.g., polytetrafluoroethylene), a low density polyethylene (PE), or any polymer with a low dielectric constant and good mechanical strength may be used to form contact housing 64. Mechanical bonds may be formed at the junctions between contacts 62 and contact housing 64, forming well sealed interfaces. For example, there may be 30 laterally spaced contacts each of which is insert molded into contact housing 64. Once released from the mold of the insert molding tool, contact housing 64 may provide mechanical support for each contact 62 and may electrically isolate contacts 62 from one another.

Each contact 62 may have an engagement feature such as a barbed portion 62-C to help secure contact 62 within contact housing 64. Each contact 62 may also have a portion such as contact portion 62-A that is not covered by contact housing 64 and is therefore exposed to the external environment (i.e., to connect with a mating plug). Each contact 62 may also have a portion such as tail portion 62-B that is not covered by contact housing 64 and that may therefore be connected to components internal to device 10 (e.g., a rigid printed circuit board or a flex circuit).

Contact housing 62 may be encased within optional metal shell 66. Metal shell 66 may be formed from a sheet of metal such as stainless steel (e.g., SUS301-1/2H or SUS304-1/2H) or other material that is strong enough to provide physical guidance for a mating plug. Metal shell 66 may be able to withstand lateral twisting loads (e.g., to prevent damage in a scenario in which a mating plug is connected to connector 36 and is subject to tugs). Contact housing 64 may be attached to metal shell 66 by a friction fit.

Connector housing 68 may be molded around metal shell 66 using an insert molding technique of the type described in connection with FIG. 2. Connector housing 68 may also seal off latch holes (e.g., holes used for securing mating plugs) that may optionally be present in metal shell 66.

A second shot of thermoplastic such as polyamide (e.g., PA 46), polyetheretherketone (PEEK), liquid crystal polymer (LCP), or other suitable polymer can be used to form connector housing 68. An elastomeric sealing member such as member 80 (e.g., a rubber gasket) may be formed as an integral part of connector housing 68. When formed in this way, chemical bond may be formed between connector housing 68 and sealing member 80. Tail portion 62-B may lie flat against a back planar wall of connector housing 68. Gasket 80 forms a seal between device housing 12 and housing 68.

Additional connector sealing portion 68' may seal off the friction fitted junction between contact housing 64 and metal shell 66. If the friction fit between contact housing 64 and metal shell 66 is sufficiently tight, connector sealing portion 68' may be omitted (e.g., the presence of this thermoplastic seal is an optional feature).

Connector housing 68 of FIG. 3 may completely seal off connector 36 and thereby prevent moisture intrusion through the junctions between contacts 62 and contact housing 64, through the junction between contact housing 64 and metal shell 66, and through connector 36 itself.

When assembled, connector housing 66, elastomeric sealing member 80, metal shell 66, contact housing 64, and contacts 36 formed a sealed connector 36. Connector 36 may be placed into a port opening within device housing 12. In order to effectively seal off the junction between connector 36 and device housing 12, connector 36 may be pushed against device housing 12 in the direction of arrow 79. In this way, device housing 12 exerts a compressive force against sealing member 80. A screw 81 or other mounting arrangement may be used to fasten connector 36 to device housing 12 and thereby hold the sealing member in the compressed state. In the compressed state, sealing member 80 forms a seal between device housing 12 and connector 36 that is sufficient to prevent moisture intrusion.

As shown in FIG. 3, an elastomeric gasket or other display sealing member 82 may be used to seal the junction between device housing 12 and display 16.

Tail portions 62-B (e.g., contact solder tails) of contacts 62 may be connected to traces on a substrate or other suitable conductive paths. The substrate may be a rigid or flexible printed circuit board such as flex circuit 84. Circuit 84 may be a rigid-flex circuit (e.g., a flex circuit formed as an integral portion of a rigid circuit board). Flex circuit 84 may be formed using a thin sheet of polymer such as polyimide. Flex circuit 84 may have a substantially planar surface. Solder pads may be formed on the planar surface. Solder paste may be screen-printed onto the solder pads. Each tail portion 62-B may be placed against a corresponding solder pad on flex circuit 84. Tail portions 62-B may be soldered to the corresponding solder pads using a reflow process that melts the solder paste. Each solder pad may be connected through traces on flex circuit 84 to other electrical components (e.g., a processor and memory circuitry). In scenarios in which connector 36 is a 30-pin connector, there may be 30 solder pads on flex circuit 84 and 30 soldered connections to 30 corresponding pins 62. Not all the soldered connections may be active (e.g., not every contact may be in use during actual operations of electronic device 10).

Figure 4:
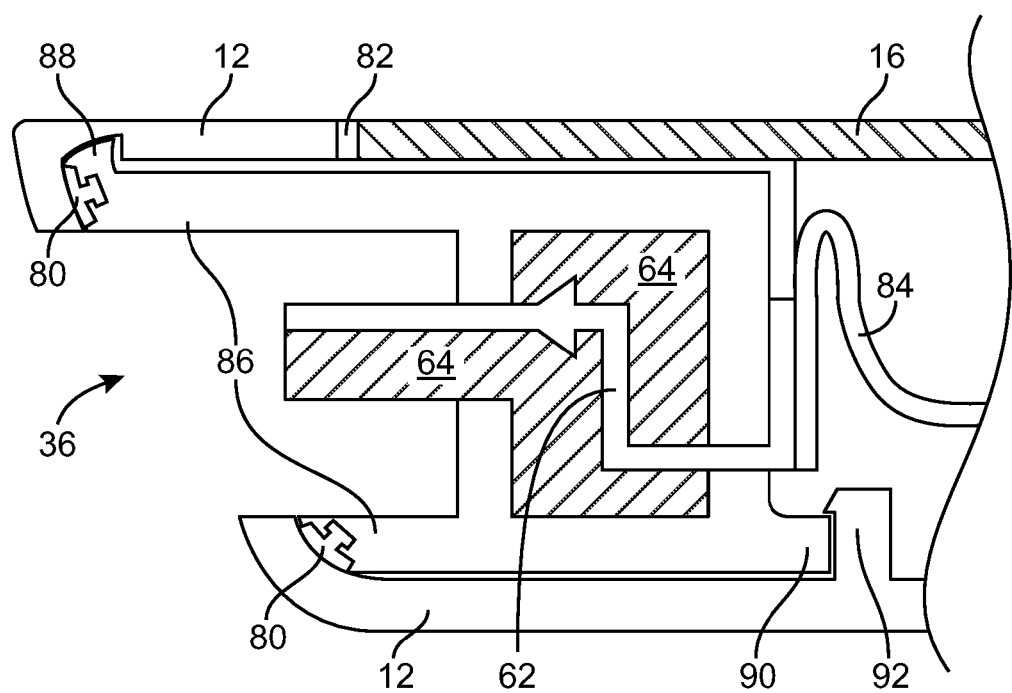
FIG. 4 is a cross-sectional side view of an illustrative sealed connector without a metal shell in accordance with an embodiment of the present invention.

If desired, the metal shell in connector 36 may be omitted. As shown in FIG. 4, for example, connector 36 may have an integrated housing such as connector housing 86 that is directly molded around contact housing 64. Integrated connector housing 86 may be formed by a second shot of thermoplastic using the insert molding process described in connection with FIG. 2. Integrated connector housing 86 may be formed from a strong thermoplastic material such as polyetherimide that is strong enough to provide physical guidance for the mating plug and that is able to withstand lateral twisting loads in situations in which the mating plug is connected to connector 36 and in which the mating connector is subject to tugs. Integrated connector housing 86 may not include a metal shell. Connector sealing portion 68' shown in the connector of FIG. 3 may be integrated with integrated connector housing 86 to form a continuous piece of housing.

For example, connector housing 86 of FIG. 4 may have horned portion (can be referred to as extending portion) 88 and protruding portion 90. Connector 36 may use portions 88 and 90 to snap into a corresponding notch and clip 92 formed in device housing 12. Seating connector 36 into device housing 12 in this way may eliminate the need for screw 81. A connector secured using this type of snapping mechanism may place sealing member 80 in a compressed state. In the compressed state, sealing member 80 forms a seal between device housing 12 and connector 36 that prevents moisture intrusion.

Figure 5:
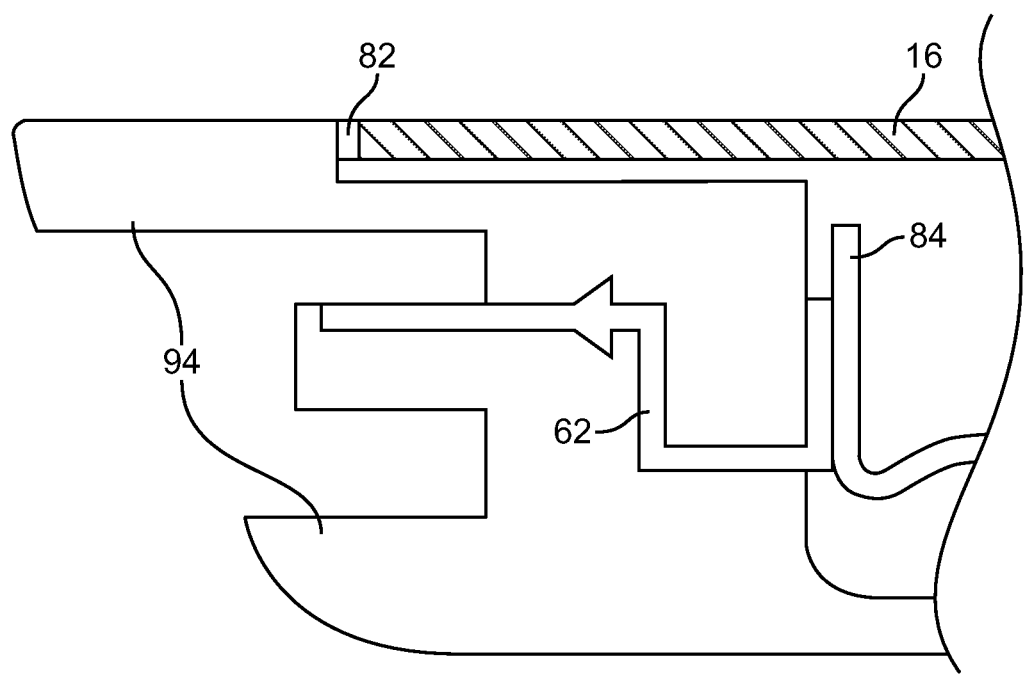
FIG. 5 is a cross-sectional side view of an illustrative sealed connector integrated with the housing of a portable electronic device in accordance with an embodiment of the present invention.

Connector 36 may be formed as an integral part of device housing 12. As shown in FIG. 5, integrated device housing 94 (e.g., device housing 12 of FIG. 1) may be molded around contact 62. Integrated device housing 94 may be formed from a single shot of thermoplastic using the insert molding process described in connection with FIG. 2. Integrated device housing 94 may be formed using polyetherimide (e.g., ultem), polyetheretherketone (PEEK), liquid crystal polymer (LCP), polycarbonate (PC), acrylonitrile butadiene styrene (ABS), PC/ABS blends, or other polymer that can be used in an insert molding process. Contacts that are inserted in this manner may be completely sealed off by mechanical bonds between contact 62 and integrated device housing 94. If desired, device housing 94 may form part of a lower housing assembly that is mated to an upper housing assembly to form housing 12 of FIG. 1.

Figure 6:
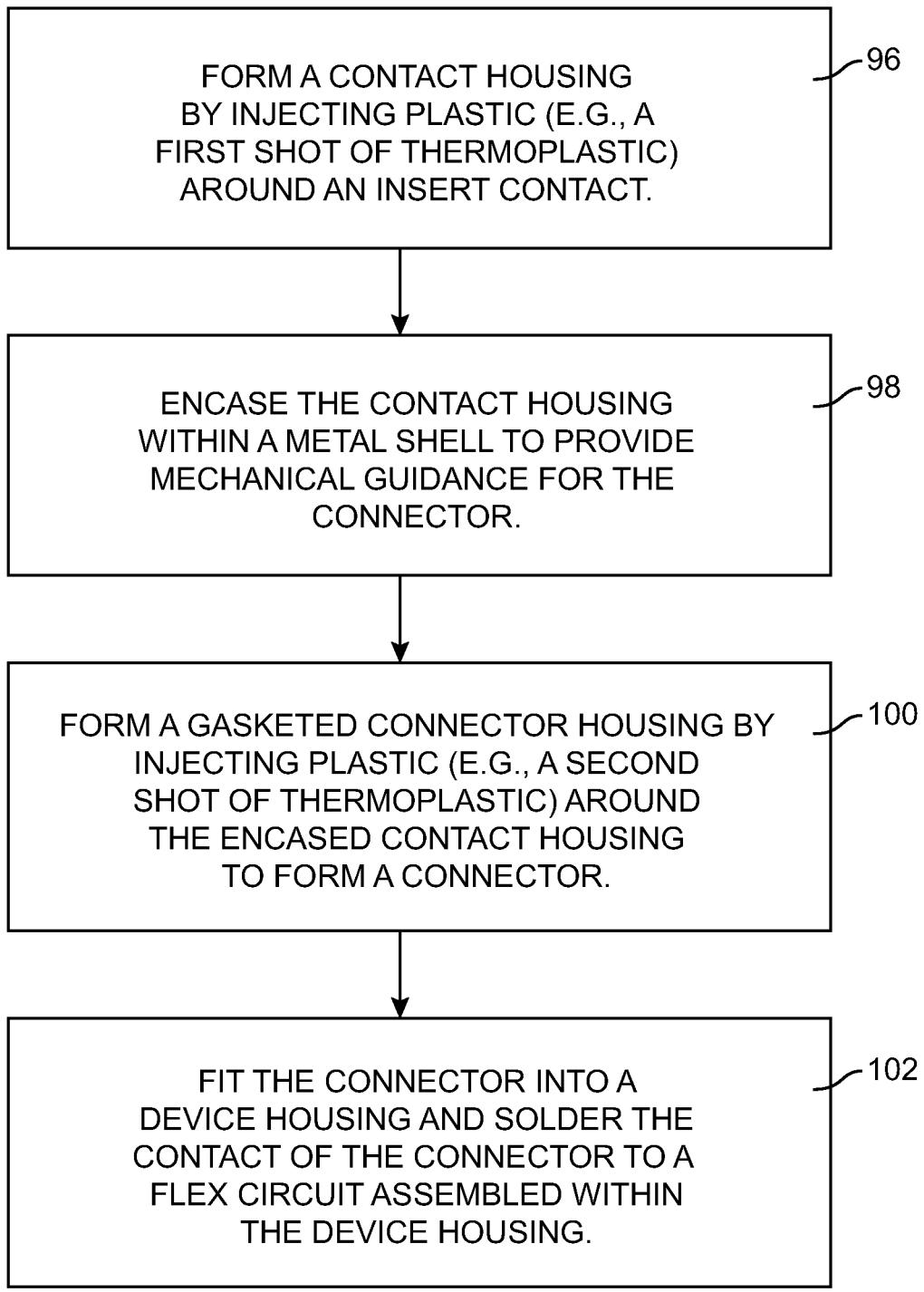
FIG. 6 is a flow chart of illustrative steps involved in forming a sealed connector of the type shown in FIG. 2 in accordance with an embodiment of the present invention.

FIG. 6 is a flow chart of illustrative steps involved in forming a sealed connector such as connector 36 of FIG. 3. At step 96, a contact housing may be formed that molds around insert pieces (e.g., contacts). The contact housing may be formed by injecting a first shot of thermoplastic material using the insert molding technique.

At step 98, the contact housing may be encased within a metal shell. The metal shell may provide mechanical guidance for a mating plug. The contact housing may be mounted within the metal shell using a friction fit.

At step 100, a connector housing may be formed that molds around the metal shell. The connector housing may be formed by injecting a second shot of thermoplastic material using the injection molding technique. A different type of thermoplastic material may be used for the second shot. An elastomeric sealing member (e.g., a rubber gasket) may be integrated into the connector housing to form a gasketed connector housing, if desired.

At step 102, the connector (e.g., the combination of the connector housing, the metal shell, the contact housing, and the contact) may be mounted within a device housing of a portable electronic device or other equipment. The connector may be pressed against the walls of the device housing so that gasket seals off the junction between the connector and the device housing. In this compressed state, the connector may be held in place within to the device housing by a snap, screw, or other suitable mounting structure. A flex circuit located within the electronic device may have solder pads that are soldered to corresponding contacts on the sealed connector.

The procedure described in FIG. 6 is merely illustrative. For example, more than two shots of thermoplastic material may be used to form seals between any suitable number of connector and device components, if desired.

Figure 7:
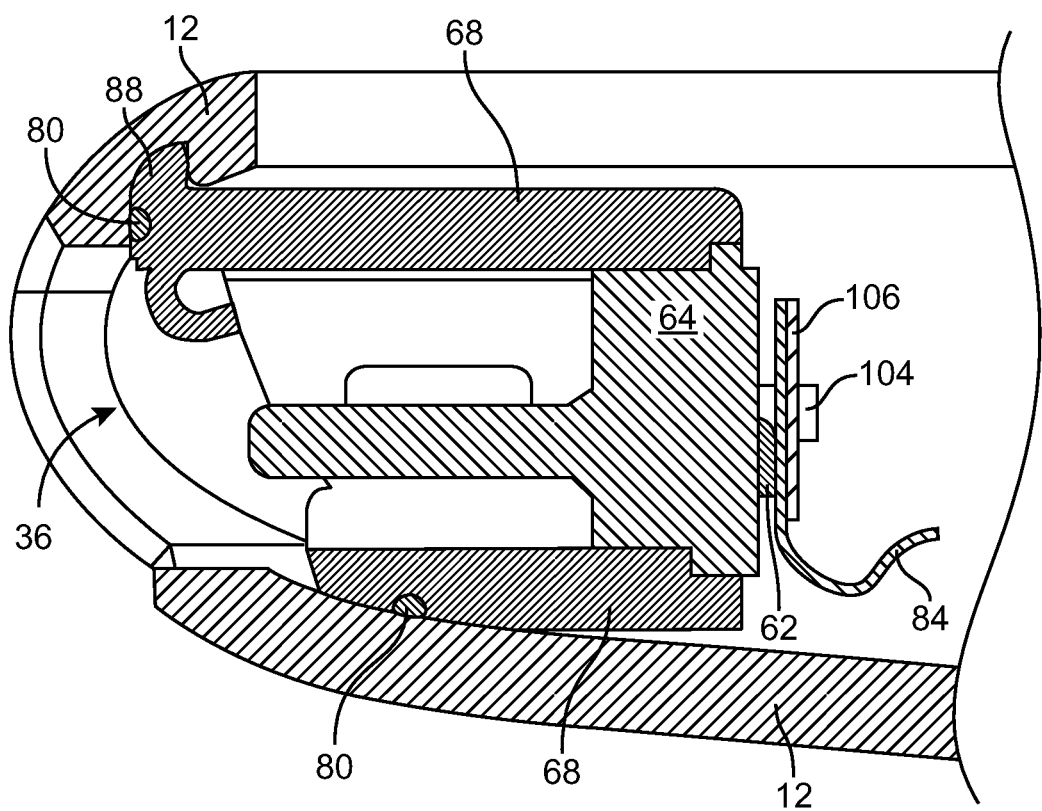
FIG. 7 is a cross-sectional side view of an illustrated sealed connector in accordance with an embodiment of the present invention.

As shown in FIG. 7, connector 36 may have additional features. Contact housing 64 may have extending portion 104. Portion 104 may protrude out of connector housing 68. Connector 36 may have supporting structure 106 that helps secure flex circuit 84 to contact 62. Supporting structure 106 and flex circuit 84 may have a hole. Portion 104 may be inserted into the hole during assembly.

Figure 8:
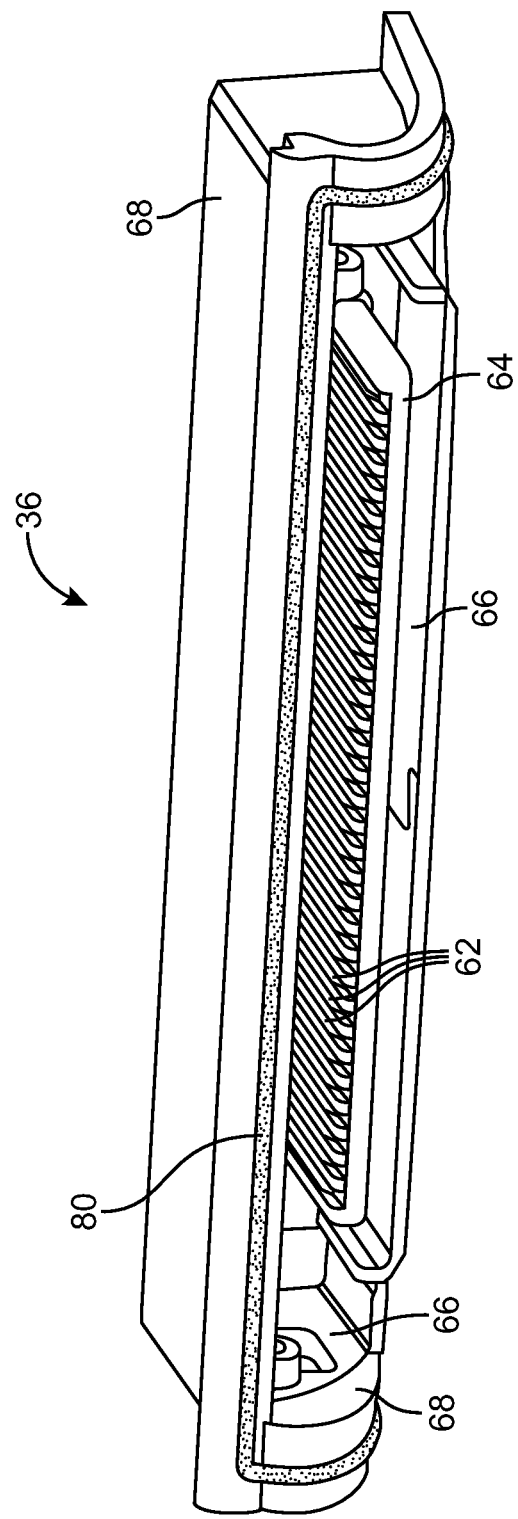
FIGS. 8-9 are perspective views of illustrative connectors with a surrounding gasket in accordance with an embodiment of the present invention.

To clearly illustrate the structure of gasket 80, FIG. 8 shows a perspective view of connector 36 with gasket 80. Gasket 80 may line the border of connector housing 68 to form a rectangular structure.

Figure 9:
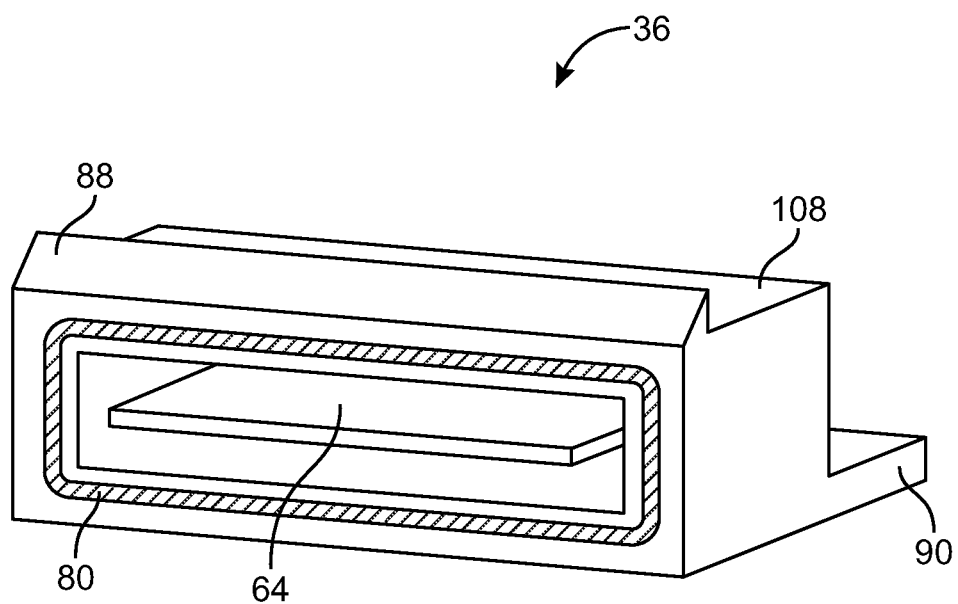

FIG. 9 shows an illustrative connector that has gasket 80. The connector may have connector housing 108 with a front face. Gasket 80 may line the edge of the front face to form a rectangular border. The connector may have horned (can be referred to as an engagement structure) portion 88 and protruding portion 90.

Figure 10A:
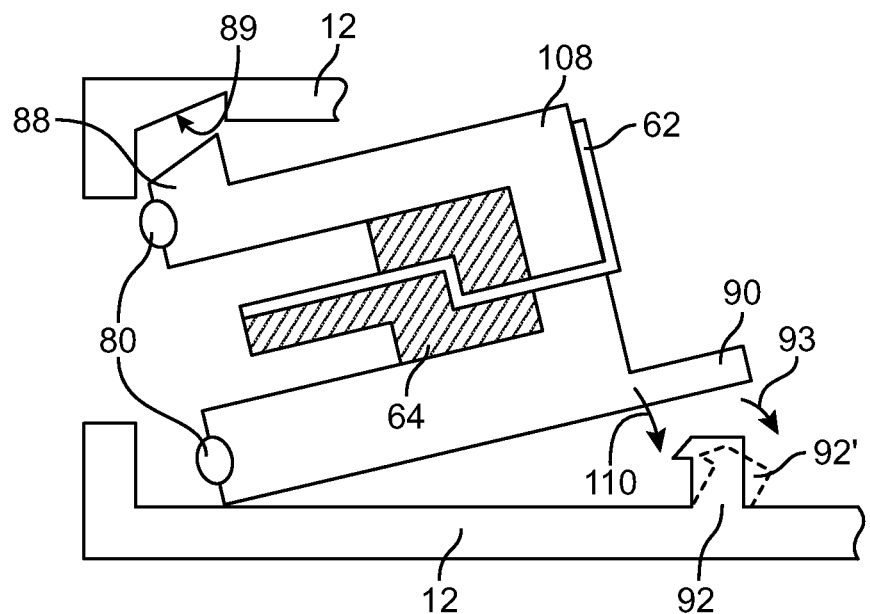
FIGS. 10A and 10B are cross-sectional side views showing steps involved in mounting a moisture-sealed connector into a device housing a snap mechanism in accordance with an embodiment of the present invention.

The connector of FIG. 9 may be mounted in device housing 12 using a snap mechanism. The connector may be tilted in a position as shown in FIG. 10A. Horned portion 88 or other suitably shaped engagement structure of the connector may be initially placed against a corresponding notch in the upper assembly of housing 12. The notch receives and engages portion 88 so that the connector pivots about the notch. Gasket 80 may not yet be fully compressed in this tilted position. The connector may then be rotated (pivoted) downwards in the direction of arrow 110. As the connector is rotated downwards into its mounted position, protruding portion 90 of the connector may push clip 92 (e.g., in the direction of arrow 93) to temporary position 92'. When the bottom of the connector is seated against the surface of the lower housing assembly, clip 92 may snap back to its original position (shown in FIG. 10B). Clip 92 may clamp onto portion 90 to secure the connector in place in the device housing. Clip 92 may also push the connector in the direction of arrow 79 to compress gasket 80 between the connector housing and the device housing. In the compressed state, gasket 80 may seal the interface between housing 12 and connector housing 108 to prevent moisture from entering the housing.

Figure 10B:
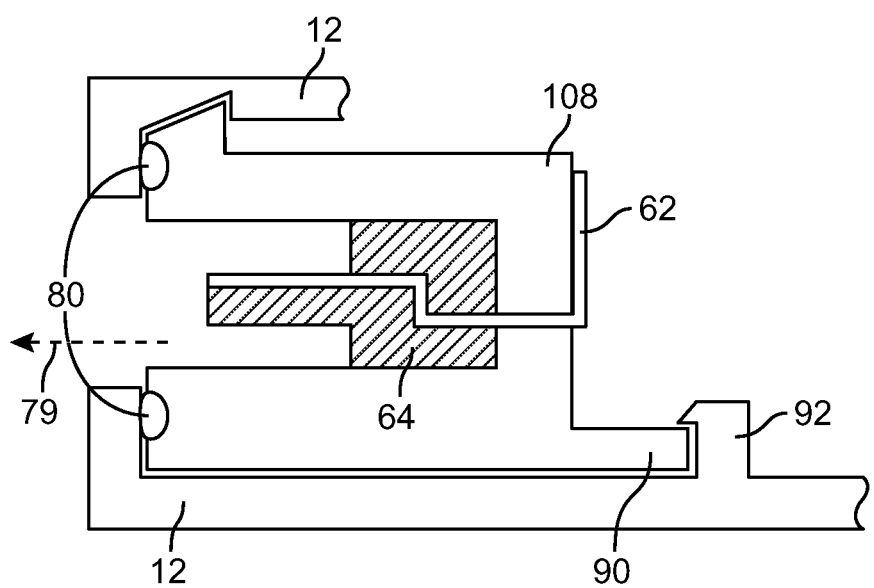
Figure 11:
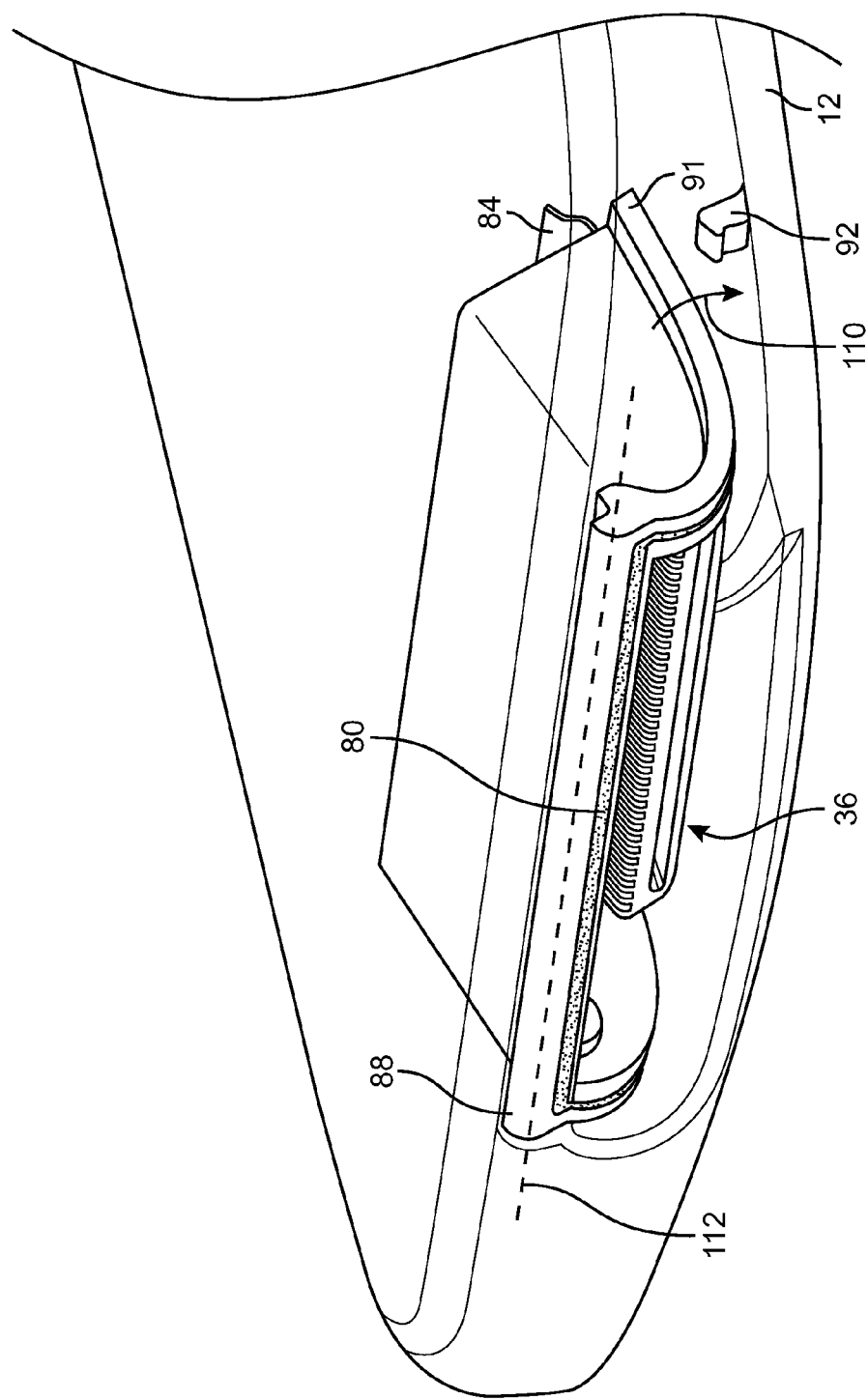
FIGS. 11 and 12 are perspective views showing the steps involved in mounting a moisture-sealed connector into a device housing a snap mechanism in accordance with an embodiment of the present invention.
Figure 12:
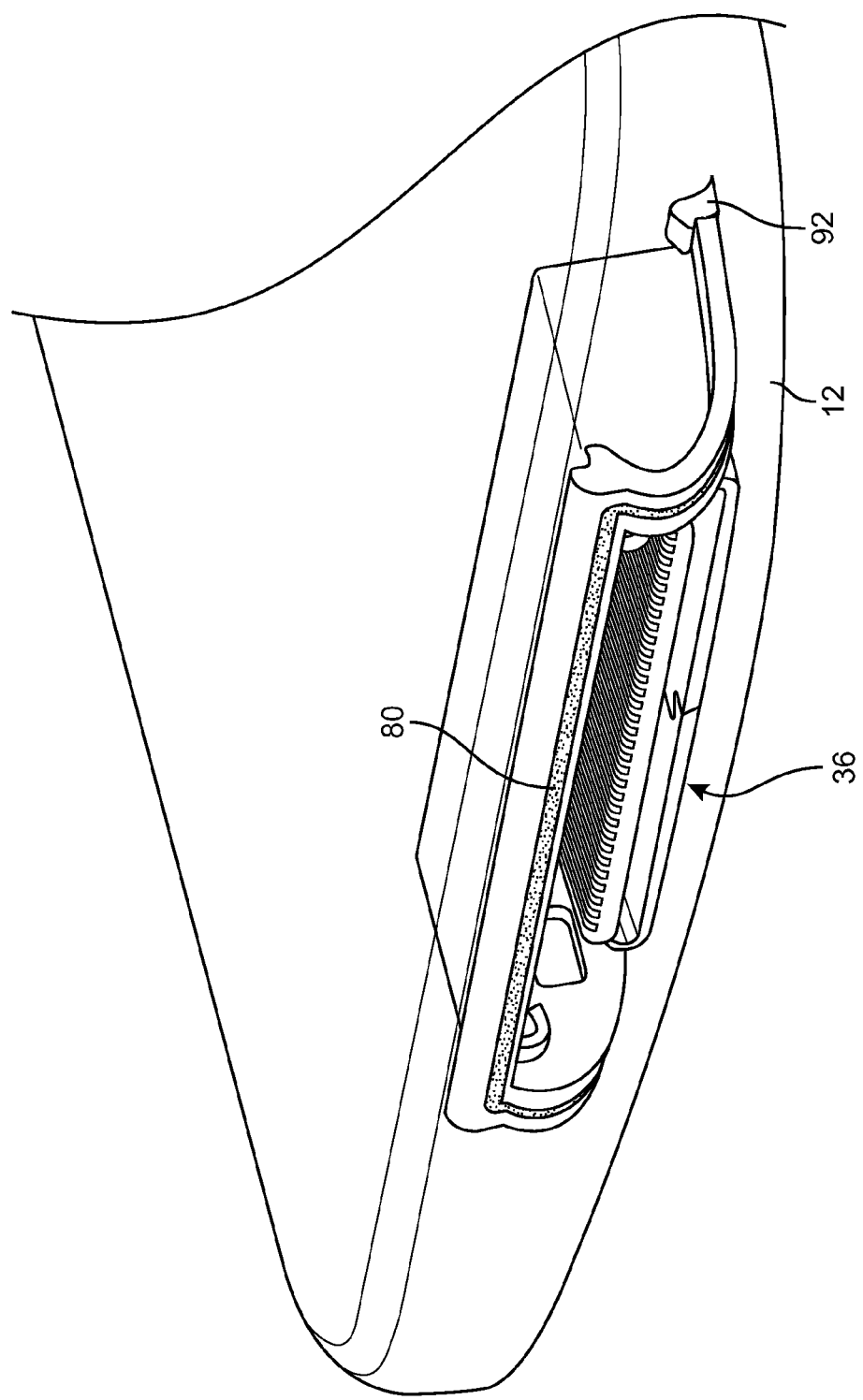

Connectors 36 of the type described in connection with FIGS. 7 and 8 may be mounted within device housing the steps illustrated in FIGS. 10A and 10B. As shown in FIGS. 11 and 12, connector 36 may have a horned portion such as portion 88 (sometimes referred to as a protrusion, protruding portion, extending portion, extending structure, etc.). Portion 88 may mate with a corresponding notch such as notch 89 of FIG. 10A (sometimes referred to as a groove, recess, etc.) in housing 12. Connector 36 may also have a protruding portion such as portion 91 that extends laterally from connector 36. When extending portion 88 is engaged within notch 89, extending portion 88 and notch 89 form a hinge structure. This hinge structures allows connector 36 to pivot about pivot (hinge) axis 112. Connector 36 may, for example, be rotated (pivoted) downwards in direction 110 (FIG. 11) to snap protruding portion 91 into clip 92 (as shown in FIG. 12).

The foregoing is merely illustrative of the principles of this invention and various modifications can be made by those skilled in the art without departing from the scope and spirit of the invention.

What is claimed is:

1. A connector, comprising:
   a plurality of conductive signal contacts;
   a plastic contact housing that is molded around the plurality of conductive signal contacts, wherein the plastic contact housing is sealed around the plurality of conductive signal contacts;
   a metal shell that encases the plastic contact housing; and
   a connector housing that is molded around the metal shell to seal the connector.

2. The connector defined in claim 1, wherein the connector housing includes a substantially rectangular gasket.

3. The connector defined in claim 1, further comprising:
   a flex circuit having a plurality of solder pads, wherein each conductive signal contact in the plurality of conductive signal contacts is soldered to a respective one of the plurality of solder pads.

4. The connector defined in claim 1, wherein the connector housing includes a connector sealing portion that is configured to seal a junction between the connector housing and the metal shell.

5. The connector defined in claim 1 further comprising a gasket on the connector housing.

6. The connector defined in claim 1 further comprising a gasket, wherein the connector housinq is molded at least partially around the gasket.

7. A connector, comprising:
   a plurality of conductive signal contacts;
   a plastic contact housing that is molded around the plurality of conductive signal contacts, wherein the plastic contact housing is sealed around the plurality of conductive signal contacts;
   a connector housing that is molded around the plastic contact housing to seal the connector; and
   a gasket, wherein the connector housing is molded at least partially around the gasket.

8. The connector defined in claim 7, further comprising:
   a flex circuit having a plurality of solder pads, wherein each conductive signal contact in the plurality of conductive signal contacts is soldered to a respective one of the plurality of solder pads.

9. The connector defined in claim 7, wherein the gasket comprises a substantially rectangular gasket.

10. An electronic device, comprising:
a device housing; and
a moisture-sealed data port connector mounted within the device housing, wherein the moisture-sealed data mounted connector comprises:
a plurality of laterally spaced contact leads soldered to the plurality of solder pads;
a contact housing that is molded around the plurality of laterally spaced contact leads;
a metal shell that surrounds at least part of the contact housing; and
a connector housing that is molded around the metal shell, wherein the electronic device further comprises a substrate a having a plurality of solder pads, wherein the substrate is located within the device housing, and wherein the solder pads are soldered to the laterally spaced contact leads.

11. The electronic device defined in claim 10, wherein the sealed data port connector includes a gasket that is pressed against the device housing by the connector housing.

12. The electronic device defined in claim 11, wherein the sealed data port connector is attached to the device housing by a clip structure that is connected to the device housing.

13. The electronic device defined in claim 11, wherein the sealed data port connector has an extending portion and a protruding portion and wherein the device housing has a notch that receives the extending portion so that the sealed data port connector pivots about the notch and has a clip that receives the protruding portion to hold the sealed data port connector in place with the device housing.

14. The electronic device defined in claim 10, wherein the sealed data port connector comprises at least thirty of the laterally spaced contact leads.

15. The electronic device defined in claim 10, wherein the substrate is a flex circuit.

16. The electronic device defined in claim 10, further comprising:
a display mounted in the device housing; and
a display sealing member configured to seal a junction between the device housing and the display.

17. The electronic device defined in claim 10, wherein the connector housing includes a connector sealing portion that is configured to seal a junction between the connecter housing and the metal shell.

18. An electronic device comprising:
a plurality of laterally spaced data port contact leads;
an insert-molded device housing enclosed that is insert-molded around the contact leads so that moisture is prevented from entering the electronic device at an interface between the contact leads and the insert-molded device housing enclosure, wherein the data port contact leads have bent portions that are exposed to an interior of the device housing enclosure; and
a flex circuit having a plurality of solder pads, wherein the flex circuit is located within the interior of the device housing enclosure and wherein the solder pads are soldered to the respective contact leads.

19. The electronic device defined in claim 18, wherein the plurality of contact leads comprises at least 30contact leads.

20. The electronic device defined in claim 18 wherein the electronic device housinq enclosure comprises a single-shot injection-molded electronic device housing enclosure.

21. The electronic device defined in claim 18 wherein the electronic device housing enclosure comprises a connector housing that surrounds the contact leads, wherein the connecter housing is integral with the electronic deice housing enclosure.

* * * * *